United States Patent Office 3,352,112
Patented Nov. 14, 1967

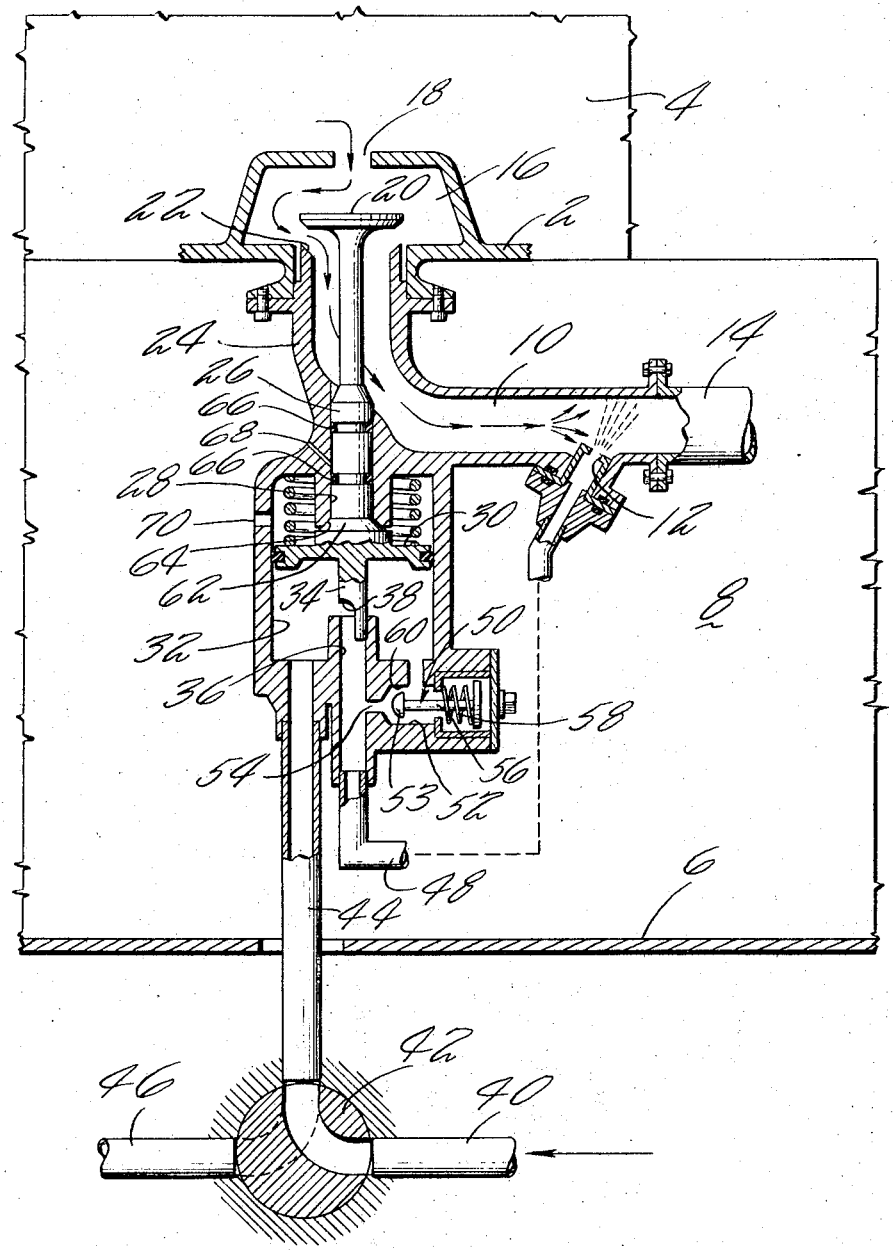

3,352,112
BLEED CONTROL IN MIXING VALVE FOR
A TURBOFAN ENGINE
Terry J. Chase, Thompsonville, Conn., assignor to United
Aircraft Corporation, East Hartford, Conn., a corporation of Delaware
Filed Apr. 21, 1965, Ser. No. 449,731
6 Claims. (Cl. 60—261)

ABSTRACT OF THE DISCLOSURE

A mixing and bleed valve construction for use in gas turbine engines wherein hot turbine exhaust gas is withdrawn from the exhaust stream and mixed with fuel for combustion in a stream of cool air.

---

This invention relates to a mixing and bleed valve arrangement for use in a gas turbine engine.

One feature of this invention is the withdrawal of hot gas as from a gas turbine to mix with fuel for combustion in a stream of cool air. Another feature is to purge the device when it is shut down to eliminate any fuel therefrom. Another feature is the use of hot turbine exhaust to mix with and vaporize fuel to support combustion in the fan duct for air in a turbofan engine.

One feature is a control by which to mix hot turbine exhaust gas with fuel and by which to purge the system when fuel is shut off thereby to prevent "coking" within the control.

Other features and advantages will be apparent from the specification and claims, and from the accompanying drawing which illustrates an embodiment of the invention.

The single figure is a diagrammatic view showing the invention applied to a turbofan engine.

The invention is shown in connection with a turbofan engine in which the wall 2 represents the wall forming the exhaust duct 4 for the engine and the wall 6 represents the outer wall of the fan duct 8, the latter being located between the wall 2 and the wall 6. The invention is shown in an arrangement for removing hot gas from the turbine exhaust duct through a conduit 10 mixing this gas with fuel discharged into said duct from a nozzle 12 and delivering the mixture of hot gas and fuel through an extension 14 of the duct 10 to a spray device located in the fan duct at a point downstream of the device, as shown. It has been found that a mixture of hot gas and fuel in this way will serve to support combustion within the fan duct when duct burning is desirable. It will be understood that the device has other uses.

The device includes a collector ring 16 mounted internally of the duct wall 2 and having openings 18 therein to receive hot gas from the duct 4. A valve 20 engages a seat 22 on the end of a casing 24 to control the flow of hot gas out of the chamber 16 into the device.

The valve 20 has a stem 26 slidable in a guide 28 in the casing 24 and carrying a piston 30 positioned in the cylinder 32 also provided by the casing 24. An extension 34 on the valve fits within a bore 36 forming a fuel passage within the casing 24 and this extension has a lip 38 such that when the piston 30 has moved downwardly from the position shown the lip 38 will close the end of the bore 36 to interrupt the flow of fuel through the bore.

Fuel is supplied under pressure from a supply conduit 40 to a valve 42 which is arranged either to admit fluid under pressure to the conduit 44 leading to the valve arrangement or in the opposite position of the valve 42 to vent the conduit 44 to a drain 46. The conduit 44 supplies fuel under pressure to the cylinder 32 below the piston 30 and thereby holds the piston in the position shown with the valve 20 open for the flow of hot gas through the conduit 10 and past the fuel nozzle 12. At this time fuel through the conduit 44 and into the cylinder continues through the bore 36 and a conduit 48 to the fuel nozzle 12. When the valve 42 is turned to vent the conduit 44 the pressure differential on the gas valve 20 will cause the latter to close, the extension 34 moving down and closing the passage 36. When this occurs, the pressure in the conduits 10 and 14 is sufficient to blow back through the conduit 48 and past a normally open valve 50 in a bypass 52 so that the conduit 48, the space below the piston 30 and the conduit 44 as far as the valve 42 will be purged of any fuel therein.

The valve 50 has a head 53 which engages with the end of a lateral bore 54 communicating with the bore 36 and a valve stem 56 of the valve 50 is acted upon by a spring 58 which normally holds the valve 50 in the position shown. Surrounding the head 50 is a bore 60 slightly larger in diameter than the valve head 53 so that when a flow of fluid attempts to pass the valve head 53 when the valve 42 is turned on, the pressures acting on this head will move it to close the passage 54 and prevent a flow of fuel to the fuel nozzle until a sufficient pressure is developed in the cylinder 32 to open the valve 20.

To prevent any possibility of gas from the duct 10 mixing with fuel other than at the nozzle 12, the valve stem 26 has an angled surface 62 thereon forming a valve to engage with the valve seat 64 formed at the end of the guide 28. These cooperating surfaces limit the opening movement of the valve 20 and also serve to prevent leakage of the hot gas around the stem 26 and into the cylinder above the piston. When the valve 62 is not engaged with the valve seat 64, leakage along the guide 28 is prevented by spaced ring seals 66 in the guide 28 engaging with the valve stem. The space between the seals 66 is vented into the fan duct through a passage 68. Should any leakage around the stem occur during the valve opening movement a vent 70 in the wall of the cylinder above the piston allows drippage into fan duct 8 where it is dispersed and blown away with the fan air.

With the vents 68 and 70 at the same pressure, the fan duct pressure, there will be no flow of hot gas from the passage 10 into the space above the piston 30.

It is to be understood that the invention is not limited to the specific embodiment herein illustrated and described, but may be used in other ways without departure from its spirit as defined by the following claims.

I claim:

1. A mixing device for fuel and gaseous fluid including an air duct having an inlet, a valve in the inlet, a fuel nozzle directing fuel into said duct, a fuel conduit leading to said nozzle, actuating means for said valve including a plunger, a cylinder, said cylinder forming a part of the fuel conduit, spring means acting on said plunger to keep the valve in closed position, and fuel pressure acting on said plunger to open the valve, and a shut-off valve in the conduit upstream of the cylinder whereby when fuel under pressure is admitted to the conduit the valve is opened for admission of gaseous fluid to the duct.

2. A mixing device as in claim 1 in which valve means in the conduit responsive to movement of the plunger closes the conduit downstream of the plunger when the valve is closed.

3. A mixing device as in claim 2 in which a bypass is provided around said valve means, and a pressure responsive valve in the bypass and responsive to a pressure differential across said valve is opened when the shut-off valve is closed.

4. A mixing and purging valve device as in claim 8 in which said first valve is a poppet valve, said pressure responsive means includes a cylinder, and a piston in the cylinder connected to the first valve.

5. A mixing and purging valve device as in claim 8 in which said fuel valve is a plunger-type valve including a projection on the piston as a plunger and a sleeve forming a part of the fuel conduit receiving the plunger.

6. A mixing and purging valve device for use in a turbofan engine having a fan air duct and a turbine exhaust duct, said device including a hot gas duct communicating with said turbine exhaust duct and said fan air duct and having a first valve therein, a fuel conduit communicating with said hot gas duct for delivering fuel into said hot gas duct, means responsive to pressure in said conduit for opening said first valve, a fuel valve in said conduit and movable with said first valve, said fuel valve being closed when said first valve is moved toward closed position such that said fuel valve closes the conduit before said first valve is fully closed, a bypass conduit around said fuel valve, said conduit having a normally open valve therein, and said normally open valve being arranged to close in response to a flow of fuel past said valve toward said hot gas duct.

References Cited
UNITED STATES PATENTS

| | | | |
|---|---|---|---|
| 1,864,250 | 6/1932 | Lucas | 137—114 X |
| 2,847,821 | 8/1958 | Brown | 60—262 X |

RALPH D. BLAKESLEE, *Primary Examiner.*

UNITED STATES PATENT OFFICE
CERTIFICATE OF CORRECTION

November 14, 1967

Patent No. 3,352,112

Terry J. Chase

It is hereby certified that error appears in the above numbered patent requiring correction and that the said Letters Patent should read as corrected below.

Column 2, line 69 and column 3, line 1, for the claim reference numeral "8", each occurrence, read -- 6 --.

Signed and sealed this 26th day of November 1968.

(SEAL)
Attest:

Edward M. Fletcher, Jr.
Attesting Officer

EDWARD J. BRENNER
Commissioner of Patents